L. C. BAYLES AND F. M. SLATER.
ROLLER BEARING CONSTRUCTION.
APPLICATION FILED AUG. 21, 1918.

1,346,163. Patented July 13, 1920.

INVENTOR.
L. C. Bayles & F. M. Slater
BY Joseph K. Schofield
ATTORNEYS.

UNITED STATES PATENT OFFICE.

LEWIS C. BAYLES AND FRED M. SLATER, OF EASTON, PENNSYLVANIA, ASSIGNORS TO INGERSOLL-RAND COMPANY, OF JERSEY CITY, NEW JERSEY, A CORPORATION OF NEW JERSEY.

ROLLER-BEARING CONSTRUCTION.

1,346,163.   Specification of Letters Patent.   Patented July 13, 1920.

Application filed August 21, 1918. Serial No. 250,811.

*To all whom it may concern:*

Be it known that we, LEWIS C. BAYLES and FRED M. SLATER, citizens of the United States, both residing at Easton, in the county of Northampton and State of Pennsylvania, have invented a certain new and useful Improvement in Roller-Bearing Construction, of which the following is a specification.

This invention relates to roller bearings and in particular to a bearing of this type adapted to be used in connection with gears forming the rotating motor of a percussive drill.

The objects of the present invention are to provide a bearing for rapidly rotating parts which will have a minimum frictional resistance and will be completely inclosed by the gear or other rotating member rotating upon it. A further object is to provide a bearing which will be simple, durable, easily assembled and dis-assembled and one that will not easily be damaged or put out of operation.

Figure 1:
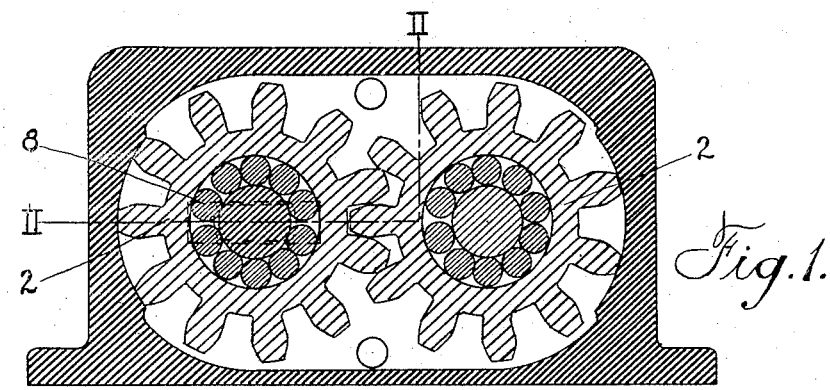
Figure 2:
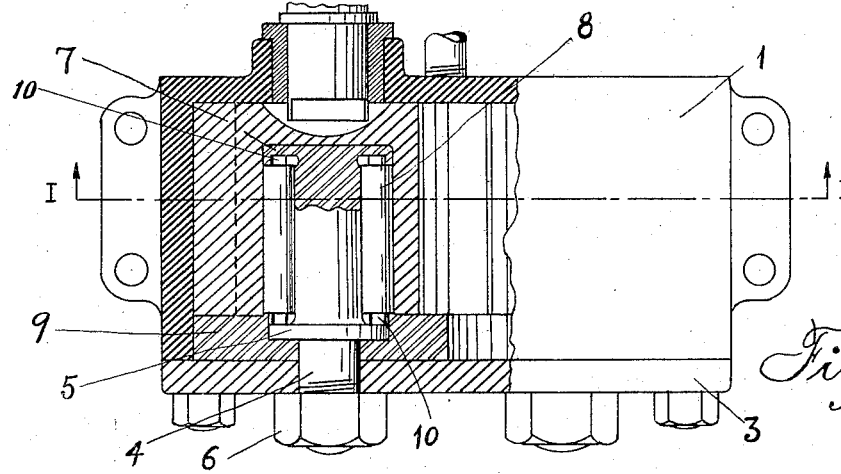
Figure 3:
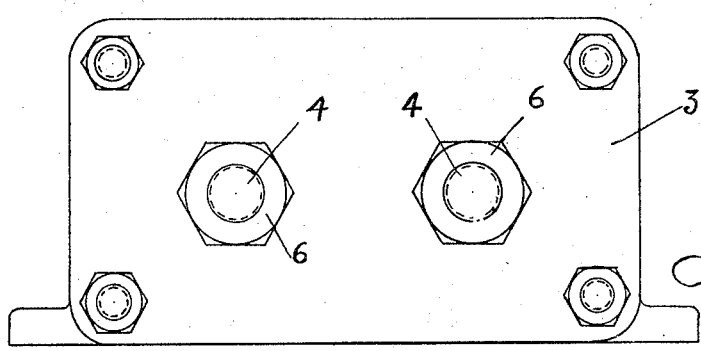
Figure 4:
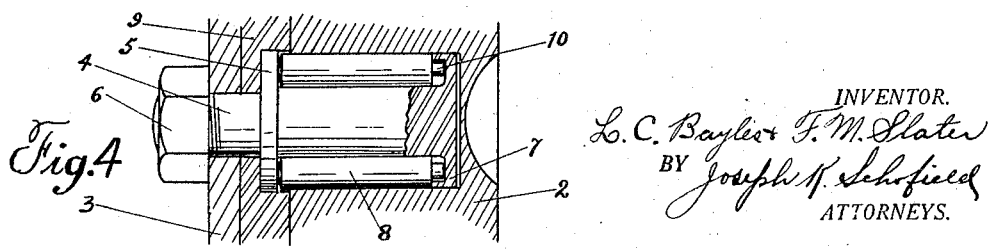

With these and other objects in view, our invention consists in the features of construction and operation set forth in the following specification and illustrated in the accompanying drawings, forming a part hereof, in which:

Figure 1 shows a cross sectional view through a pair of gears mounted on bearings made in accordance with the present invention;

Fig. 2, a top view of the construction shown in Fig. 1, partly in section;

Fig. 3, an outside view in elevation of the supporting means for the bearings; and Fig. 4, a modified form of rollers used in the bearing.

Referring more particularly to the figures of the drawing, 1 refers to the casing adapted to contain the members rotating upon the bearings made in accordance with the present invention. In the present instance this casing is adapted to contain a pair of spur gears 2 acting as a rotating motor for a percussive drill. At one side of the casing a casing cover 3 is provided to completely inclose the gears 2. Short central shafts 4 are rigidly secured in the casing cover 3 and properly spaced apart to accommodate the gears 2. In the figures this is accomplished by clamping the casing cover 3 between a flange 5 provided on the central shaft 4 and a nut 6 threaded upon the outer end of the shaft.

At the inner end of the central shaft 4 an undercut shoulder or flange 7 is provided. Between the flanges 5 and 7 are disposed the rollers 8 upon which one of the gears 2 is adapted to rotate. Rollers 8 are held in position on the shafts 4 by means of the undercut flange 7 and by reason of the fact that the flange 5 which has straight sides is slightly countersunk in a counterbored portion of a plate 9 interposed between the casing cover 3 and gears 2 at either end of the rollers 8, projections 10 being provided which project beneath the shoulder 7 at one end of the shafts 4 and into the recess formed in the plate 9 adjacent to the flange 5. By these means the bearing construction is self-contained and the rollers 8 are prevented from becoming dislocated when the gear 2 is removed and also permitted to revolve about the shaft or spindle 4 when the gear 2 is rotated.

In the modified form of the invention shown in Fig. 4, only one end of the rollers 8 is reduced in diameter to form projections 10 the opposite end being left of the full diameter. In this form the flange 5 provided on the central shaft 4 is slightly enlarged and the countersunk portion of the plate 9 enlarged sufficient to contain it. With this arrangement the full diameter of the rollers 8 extend partly within the countersunk portion of the plate 9 and the rollers 8 thus are held securely in position.

It is to be understood that the present showing and description disclose only one specific embodiment of the present invention and that other forms and modifications are included within the spirit and scope of the invention, as expressed in the claims.

What we claim is:

1. In a roller bearing construction, a supporting member, a shaft rigidly mounted thereon, said shaft having an undercut flange at its outer end, said supporting member being counterbored around said shaft, and rollers free to revolve around said shaft and having reduced extensions on one end extending into the undercut portion of said flange, the outer ends of the rollers extending into said counterbored portion of the supporting member, whereby the rollers are held in position and the bearing construction is self-contained.

2. In a roller bearing construction, a rigidly mounted central shaft having an undercut flange at one end, a flange near the opposite end set into a recess of greater depth than the thickness of said flange, rollers free to revolve around said shaft having extensions on one end of smaller diameter than that of the rollers said extensions projecting into said undercut and the other end of the rollers projecting into said recess.

3. In a roller bearing construction, a rigidly mounted central shaft having an undercut flange at one end, a flange near the opposite end set into a recess of greater depth than the thickness of said flange, rollers free to revolve around said shaft having extensions on each end of smaller diameter than that of the rollers, the extensions at one end projecting into said undercut and the extensions at the other end projecting into said recess.

4. In a roller bearing construction, a rigidly mounted central shaft provided with an undercut shoulder at one end and a flange near the opposite end, said flange fitting into a plate to form a recess, rollers surrounding said shaft and held in place by the rim of the undercut shoulder at one end and a recess in the mounting for the central shaft at the opposite end for retaining the opposite ends of said rollers.

5. In a roller bearing construction for intermeshing gears, a supporting member, a pair of shafts rigidly mounted thereon, said shafts having undercut flanges at their outer ends, said supporting member being counterbored around said shafts, rollers surrounding said shafts and free to revolve around the same, the rollers having reduced extensions at one end extending into the undercut portions of said flanges, the other ends of the rollers extending into the said counterbored portions of the supporting member, and intermeshing gears rotatably supported on said rollers.

In testimony whereof we have hereunto set our hands.

LEWIS C. BAYLES.
FRED M. SLATER.